US008809764B2

United States Patent
Kato

(10) Patent No.: US 8,809,764 B2
(45) Date of Patent: Aug. 19, 2014

(54) ABSOLUTE POSITION MEASURING ENCODER

(75) Inventor: Yoshiaki Kato, Kawasaki (JP)

(73) Assignee: Mitutoyo Corporation, Kawasaki-Shi (JP)

( * ) Notice: Subject to any disclaimer, the term of this patent is extended or adjusted under 35 U.S.C. 154(b) by 149 days.

(21) Appl. No.: 13/597,803

(22) Filed: Aug. 29, 2012

(65) Prior Publication Data

US 2013/0056624 A1 Mar. 7, 2013

(30) Foreign Application Priority Data

Sep. 1, 2011 (JP) ................................. 2011-191027

(51) Int. Cl.
*G01D 5/34* (2006.01)
*G01D 5/347* (2006.01)

(52) U.S. Cl.
CPC ............ *G01D 5/347* (2013.01); *G01D 5/34776* (2013.01)
USPC ............... 250/231.1; 250/231.14; 250/231.18

(58) Field of Classification Search
CPC .............. G01D 5/347; G01D 5/34707; G01D 5/34715; G01D 5/3473; G01D 5/34746; G01D 5/34776; G01D 5/34784; G01D 5/34792
USPC ............... 250/231.1, 231.13, 231.14, 231.15, 250/231.16, 231.17, 231.18, 237 G, 216, 250/237 R, 229; 356/614–619; 33/700, 706, 33/707
See application file for complete search history.

(56) References Cited

U.S. PATENT DOCUMENTS

| | | | |
|---|---|---|---|
| 6,512,589 B1 * | 1/2003 | Rodi | 356/617 |
| 6,664,535 B1 * | 12/2003 | Nahum et al. | 250/231.14 |
| 6,867,412 B2 * | 3/2005 | Patzwald et al. | 250/231.13 |
| 7,663,093 B2 * | 2/2010 | Kusano | 250/231.18 |
| 7,825,368 B2 * | 11/2010 | Kusano | 250/231.18 |
| 7,835,630 B2 * | 11/2010 | Kazanzides et al. | 388/815 |
| 2004/0089796 A1 * | 5/2004 | Patzwald et al. | 250/231.1 |
| 2007/0236769 A1 * | 10/2007 | Zalevsky | 359/238 |
| 2008/0252906 A1 * | 10/2008 | Kusano | 356/615 |
| 2008/0315076 A1 * | 12/2008 | Kusano | 250/231.1 |
| 2009/0283667 A1 * | 11/2009 | Morimoto | 250/231.13 |
| 2011/0273725 A1 * | 11/2011 | Milvich | 356/616 |
| 2012/0085897 A1 * | 4/2012 | Kato | 250/231.1 |
| 2013/0056624 A1 * | 3/2013 | Kato | 250/231.1 |
| 2013/0105675 A1 * | 5/2013 | Kato | 250/231.1 |

FOREIGN PATENT DOCUMENTS

| | | |
|---|---|---|
| EP | 2093543 | 8/2009 |
| EP | 2120019 | 11/2009 |
| JP | 2009-002702 | 1/2009 |

* cited by examiner

*Primary Examiner* — John Lee
(74) *Attorney, Agent, or Firm* — Rankin, Hill & Clark LLP

(57) ABSTRACT

An absolute position measuring encoder having an ABS/INC integrated pattern obtained by integrating an absolute pattern and an incremental pattern together is provided. The absolute position measuring encoder includes an imaging optical system (lens) designed to generate an amplitude difference between a light and dark signal derived from the absolute pattern and light and dark signal derived from the incremental pattern, and a signal processing system (comparator) for separating a received light signal from the ABS/INC integrated pattern into an absolute pattern signal and an incremental pattern signal by utilizing the amplitude difference. Accordingly, an absolute pattern signal and an incremental pattern signal can be separated off from the ABS/INC integrated pattern at a high speed with a simple processing circuit.

12 Claims, 8 Drawing Sheets

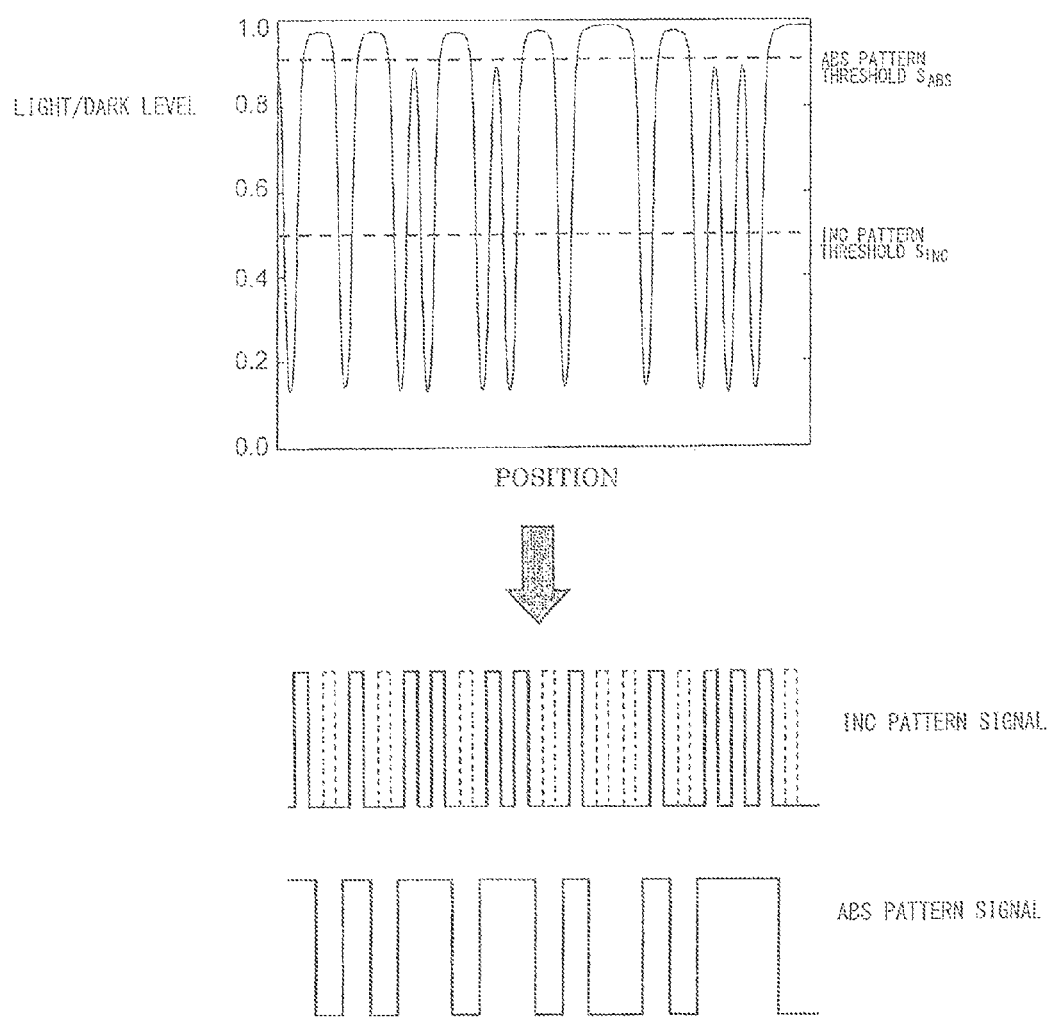

ABSOLUTE POSITION MEASURING ENCODER

CROSS-REFERENCE TO RELATED APPLICATION

The disclosure of Japanese Patent Application No. 2011-191027 filed Sep. 1, 2011 including specification, drawings and claims is incorporated herein by references in its entirety.

TECHNICAL FIELD

The present invention relates to an absolute position measuring encoder having an absolute (referred to also as ABS)/incremental (referred to also as INC) integrated pattern obtained by integrating an absolute pattern and an incremental pattern together. In particular, the present invention relates to an absolute position measuring encoder capable of separating a received light signal from the ABS/INC integrated pattern into an absolute pattern signal and an incremental pattern signal in a short operation time without employing a high-performance processing circuit.

BACKGROUND ART

An absolute position measuring encoder having an ABS/INC integrated pattern obtained by integrating an absolute pattern and an incremental pattern together has been suggested in the second and fourth embodiments of Japanese Patent Application Laid-Open No. 2009-2702 (hereinafter, referred to as Patent Literature 1). This ABS/INC integrated pattern allows a single pattern to have two types of information about an absolute pattern and an incremental pattern, thereby making it possible to narrow a scale width thereof.

However, since the ABS/INC integrated pattern has two types of information about an absolute pattern signal and an incremental pattern signal, a complicated analysis is required in order to separate these two types of information from each other. Thus, there is a problem that a high-performance processing circuit is required or a long operation time is needed. In Patent Literature 1, for example, as shown in FIG. 1 corresponding to FIG. 8 of Patent Literature 1, an absolute pattern signal (FIG. 1C) is separated off from a received light signal (FIG. 8B) by means of a low-pass filter. However, the employment of the low-pass filter leads to a longer signal processing time, thereby being unable to perform high-speed processing.

SUMMARY OF INVENTION

Technical Problem

The present invention has been made to solve the above-described problem of the conventional technique, and an object thereof is to achieve the separation of an absolute pattern signal and an incremental pattern signal in an ABS/INC integrated pattern at a high speed without employing a high-performance processing circuit.

Solution to Problem

The present invention achieves the above-described object by an absolute position measuring encoder having an absolute (ABS)/incremental (INC) integrated pattern obtained by integrating an absolute pattern and an incremental pattern together, the encoder including: an imaging optical system designed to generate an amplitude difference between a light and dark signal derived from the absolute pattern and a light and dark signal derived from the incremental pattern; and a signal processing system for separating a received light signal from the ABS/INC integrated pattern into an absolute pattern signal and an incremental pattern signal by utilizing the amplitude difference.

Here, the absolute/incremental integrated pattern may be a pattern integrating the absolute pattern and the incremental pattern together in one track by arranging the incremental pattern having a predetermined pitch INC at a position of the absolute pattern where a pseudo random pattern is arranged.

Moreover, the imaging optical system may include a lens designed to have an MTF (Modulation Transfer Function) curve so as to generate an amplitude difference between the light and dark signal derived from the absolute pattern and the light and dark signal derived from the incremental pattern.

Moreover, the lens may have an MTF curve such that an amplitude (contrast) is large for a coarse absolute pattern and an amplitude (contrast) is small for a fine incremental pattern.

Moreover, the signal processing system may include an A/D converter for converting the received light signal into a multivalued digital signal.

Moreover, the received light signal may be separated by determining a threshold by means of the amplitude difference and binarizing the received light signal.

Moreover, the absolute pattern signal can be separated off by determining the threshold as an intermediate value between a minimum value of the light and dark signal derived from the absolute pattern and a minimum value of the light and dark signal derived from the incremental pattern, and binarizing the received light signal.

Alternatively, the absolute pattern signal can be separated off by determining the threshold as an intermediate value between a maximum value of the light and dark signal derived from the incremental pattern and a maximum value of the light and dark signal derived from the absolute pattern, and binarizing the received light signal.

Moreover, the incremental pattern signal can be separated off by determining the threshold as an intermediate value between a minimum value and a maximum value of the light and dark signal derived from the incremental pattern, and binarizing the received light signal.

Moreover, the signal processing system may include: an absolute position detecting circuit for detecting an absolute position by processing the light and dark signal derived from the absolute pattern; a relative position detecting circuit for detecting a relative position by processing the incremental pattern signal; and an absolute position synthesizing circuit for combining outputs of the absolute position detecting circuit and the relative position detecting circuit together so as to output an absolute position signal interpolated by the relative position.

Moreover, the absolute position measuring encoder may be of a reflective type such that a light source and a lens are arranged on the same side with respect to a scale and a pattern signal component corresponds to a dark portion on the scale.

Moreover, the absolute position measuring encoder may be of a transmission type such that a light source is arranged on a side opposite to a lens with respect to a scale and a pattern light portion corresponds to a signal component.

Advantageous Effects of Invention

According to the present invention, the threshold of the absolute pattern and the threshold of the incremental pattern can be determined by capturing an image of the ABS/INC integrated pattern by means of the appropriately designed imaging optical system. Thus, the binarization processes based on the derived thresholds make it possible to separate both of the absolute pattern signal and the incremental pattern signal easily and quickly. According to this method, no complicated operation is required, thereby eliminating the need for a high-performance processing circuit and further achieving a reduction in an operation time thereof.

These and other novel features and advantages of the present invention will become apparent from the following detailed description of preferred embodiments.

BRIEF DESCRIPTION OF DRAWINGS

The preferred embodiments will be described with reference to the drawings, wherein like elements have been denoted throughout the figures with like reference numerals, and wherein:

FIG. 9 shows diagrams illustrating thresholds determined by means of the amplitude difference in FIG. 7 and examples of scale pattern signals obtained by binarization by means of the thresholds.

DESCRIPTION OF EMBODIMENTS

Hereinafter, exemplary embodiments of the present invention will be described in detail with reference to the drawings.

Figure 1:
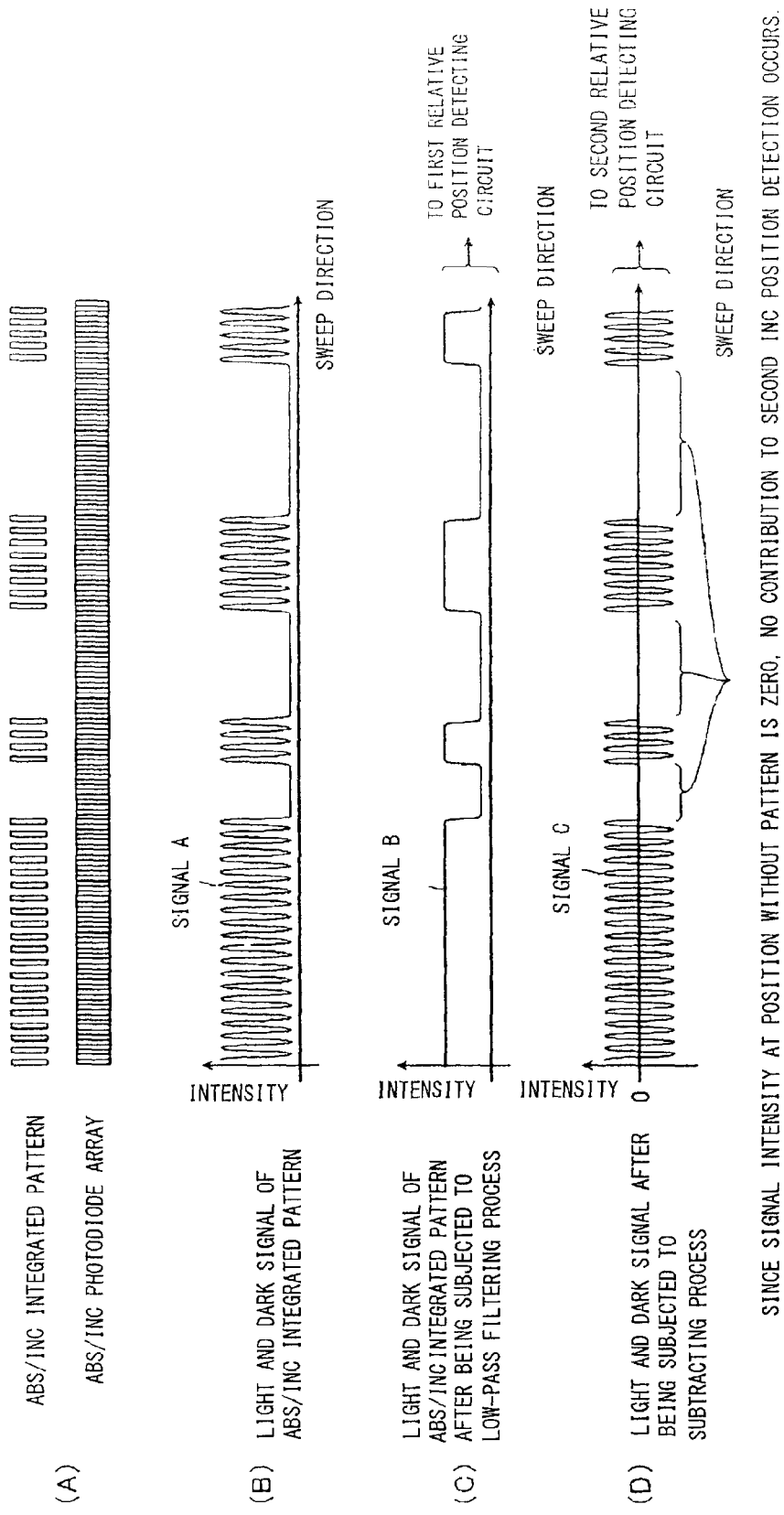
FIG. 1 shows time charts representing an outline of the conventional technique described in Patent Literature 1.
Figure 2:
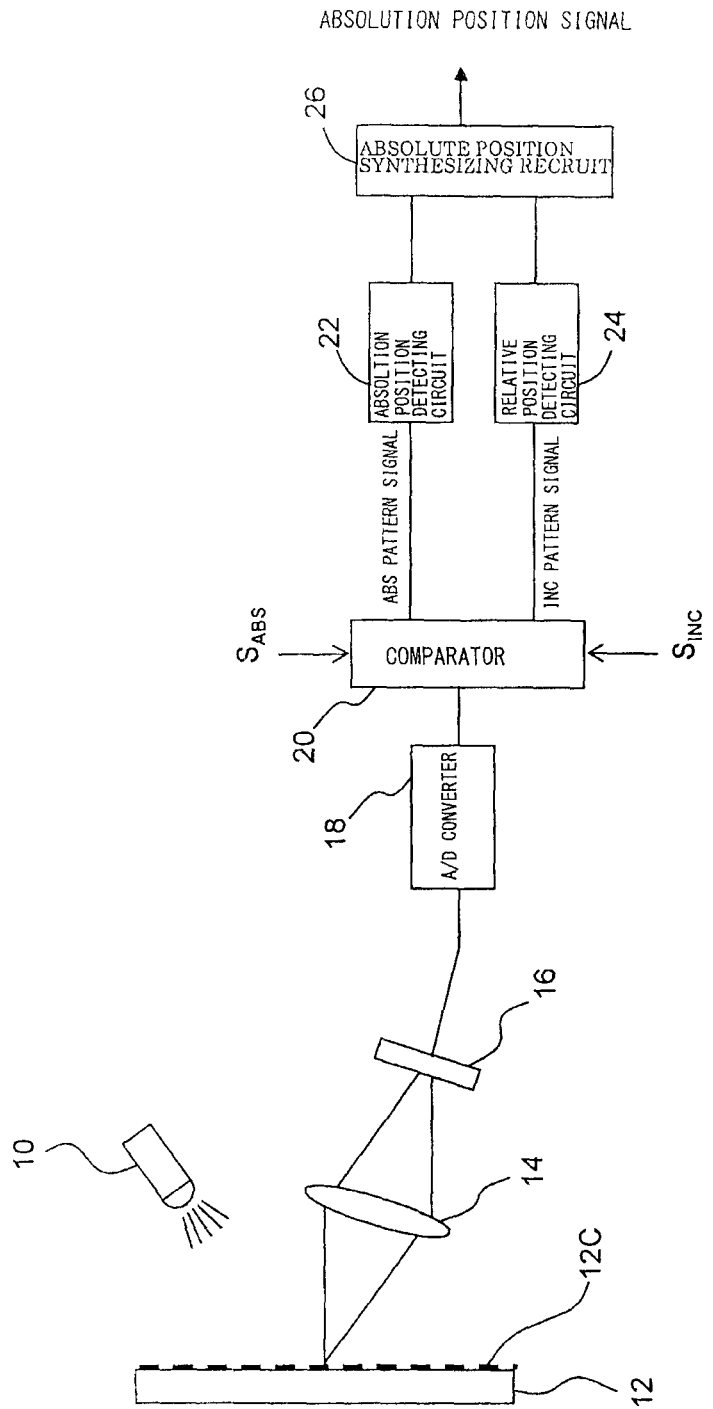
FIG. 2 is a cross-sectional view showing the entire configuration of an absolute position measuring encoder according to a first embodiment of the present invention applied to a reflective type encoder.

As the entire configuration thereof is shown in FIG. 2, the first embodiment of the present invention is obtained by applying the present invention to an absolute position measuring encoder of a reflective type in which a pattern signal component corresponds to a dark portion on a scale, for example. The absolute position measuring encoder includes: a light source 10; a reflective type scale 12 having an ABS/INC integrated pattern 12C, onto which light from the light source 10 is irradiated; a lens 14 designed to have an MTF (Modulation Transfer Function) curve so as to generate an amplitude difference between a light and dark signal derived from an absolute pattern and a light and dark signal derived from an incremental pattern; a light receiving element (for example, a photodiode array) 16 for receiving reflected light from the scale 12 through the lens 14; an A/D converter 18 for converting a light and dark signal, which is an output from the light receiving element 16, into a multivalued (for example, 256 values) digital signal; a comparator 20 for comparing a light and dark level signal, which is an output from the A/D converter 18, with a threshold $S_{ABS}$ of the absolute pattern and a threshold $S_{INC}$ of the incremental pattern; an absolute position detecting circuit 22 for detecting an absolute position by processing an absolute (ABS) pattern signal obtained by the comparator 20; a relative position detecting circuit 24 for detecting a relative position by processing an incremental (INC) pattern signal obtained by the comparator 20; and an absolute position combining circuit 26 for combining outputs of the absolute position detecting circuit 22 and the relative position detecting circuit 24 together so as to output an absolute position signal interpolated by the relative position.

Figure 3:
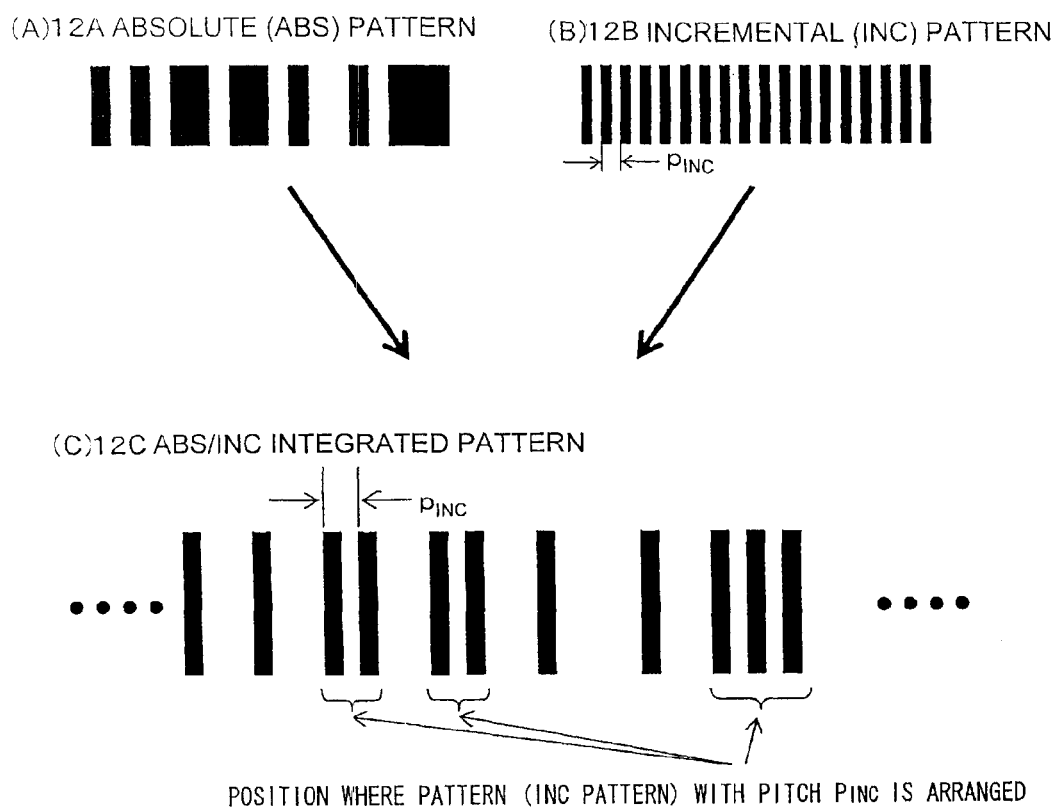
FIG. 3 is a plan view showing an ABS/INC integrated pattern according to the first embodiment.

For example, an incremental (INC) pattern 12B having predetermined pitch $p_{INC}$ as shown in FIG. 3B is arranged at a position of an absolute (ABS) pattern 12A where a pseudo random pattern is arranged as shown in FIG. 3A so as to obtain the ABS/INC integrated pattern 12C arranged on the scale 12 as shown in FIG. 3C and integrating the ABS pattern 12A and the INC pattern 12B together in one track.

Figure 4:
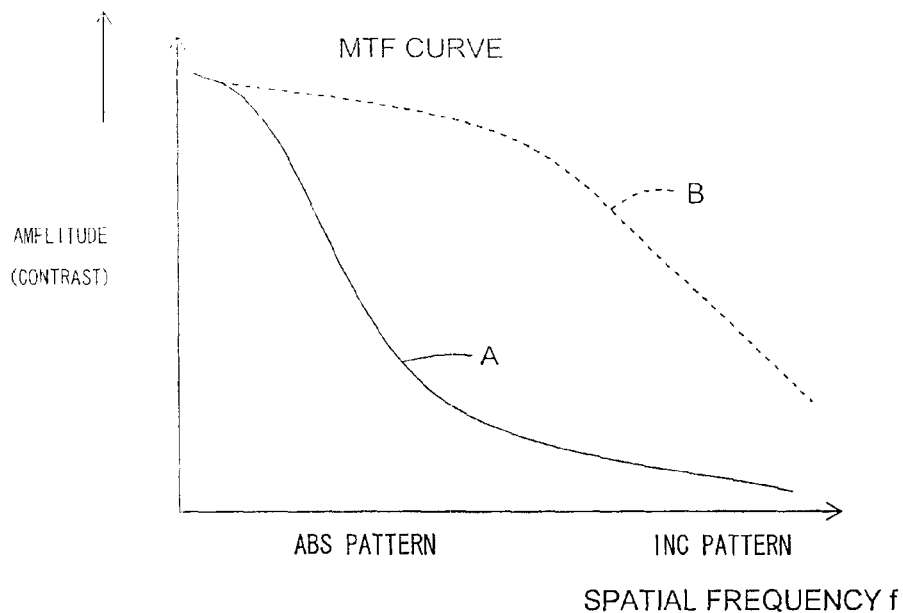
FIG. 4 is a graph showing an exemplary MTF curve of an imaging optical system according to the first embodiment.

The lens 14 has an MTF curve such that an amplitude (contrast) is large for a coarse ABS pattern and an amplitude (contrast) is small for a fine INC pattern as the MTF curve (representing how precisely an object contrast can be reproduced as spatial frequency characteristics) thereof is exemplified by a solid line A in FIG. 4. In other words, whereas a lens having an MTF curve as shown by a broken line B is typically used so as to obtain a high resolution even in a fine INC pattern, the present invention employs the lens having the MTF curve as shown by the solid line A so as to reduce the amplitude of the INC pattern (lower the resolving power thereof) only.

Figure 5:
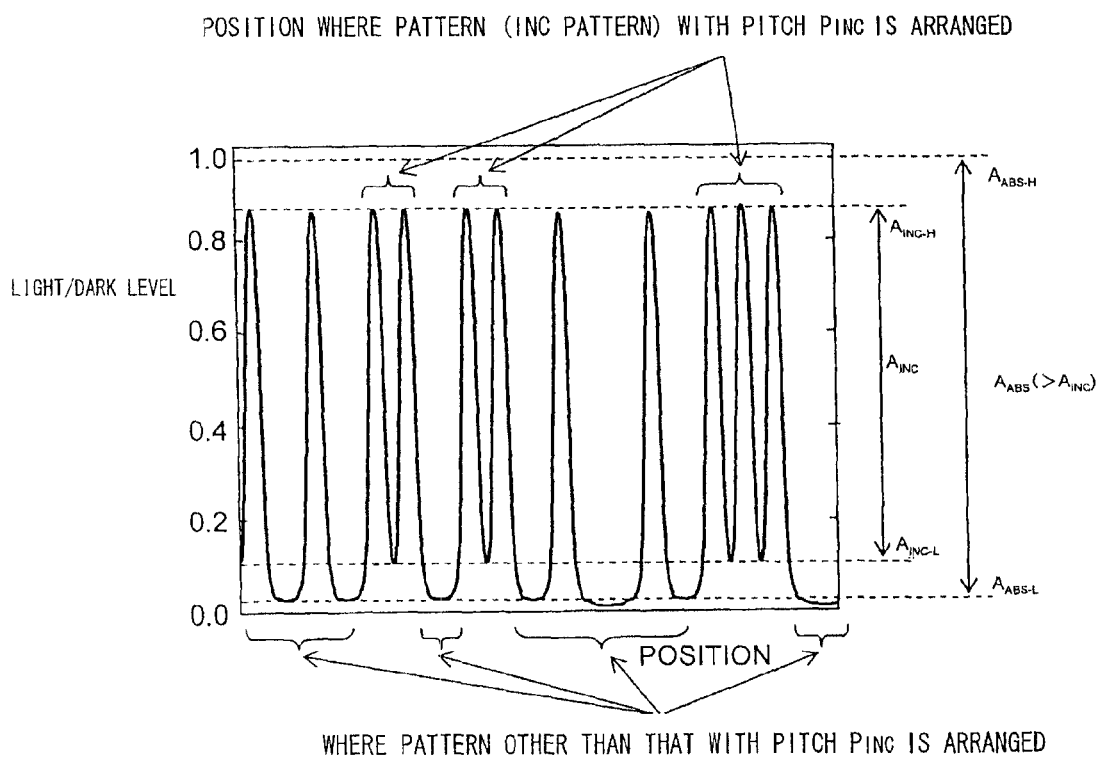
FIG. 5 is a diagram showing an exemplary amplitude difference between a light and dark signal derived from an absolute pattern and a light and dark signal derived from an incremental pattern according to the first embodiment.

If an image of the ABS/INC integrated pattern 12C is captured by such a lens 14, the amplitude A of the resultant light and dark signal reaches its maximum value $A=A_{INC}$ at a position where a pattern (INC pattern) is arranged with the pitch $p_{INC}$ (the light and dark signal derived from the INC pattern) as exemplified in FIG. 5. On the other hand, at a position where a pattern is not arranged with the pitch $p_{INC}$ (the light and dark signal derived from the ABS pattern), the amplitude thereof becomes $A=A_{ABS}$ ($>A_{INC}$). In other words, the following relationships hold true:

(the minimum value $A_{ABS-L}$ of the light and dark signal derived from the ABS pattern)<(the minimum value $A_{INC-L}$ of the light and dark signal derived from the INC pattern), and (the maximum value $A_{INC-H}$ of the light and dark signal derived from the INC pattern)<(the maximum value $A_{ABS-H}$ of the light and dark signal derived from the ABS pattern).

Figure 6:
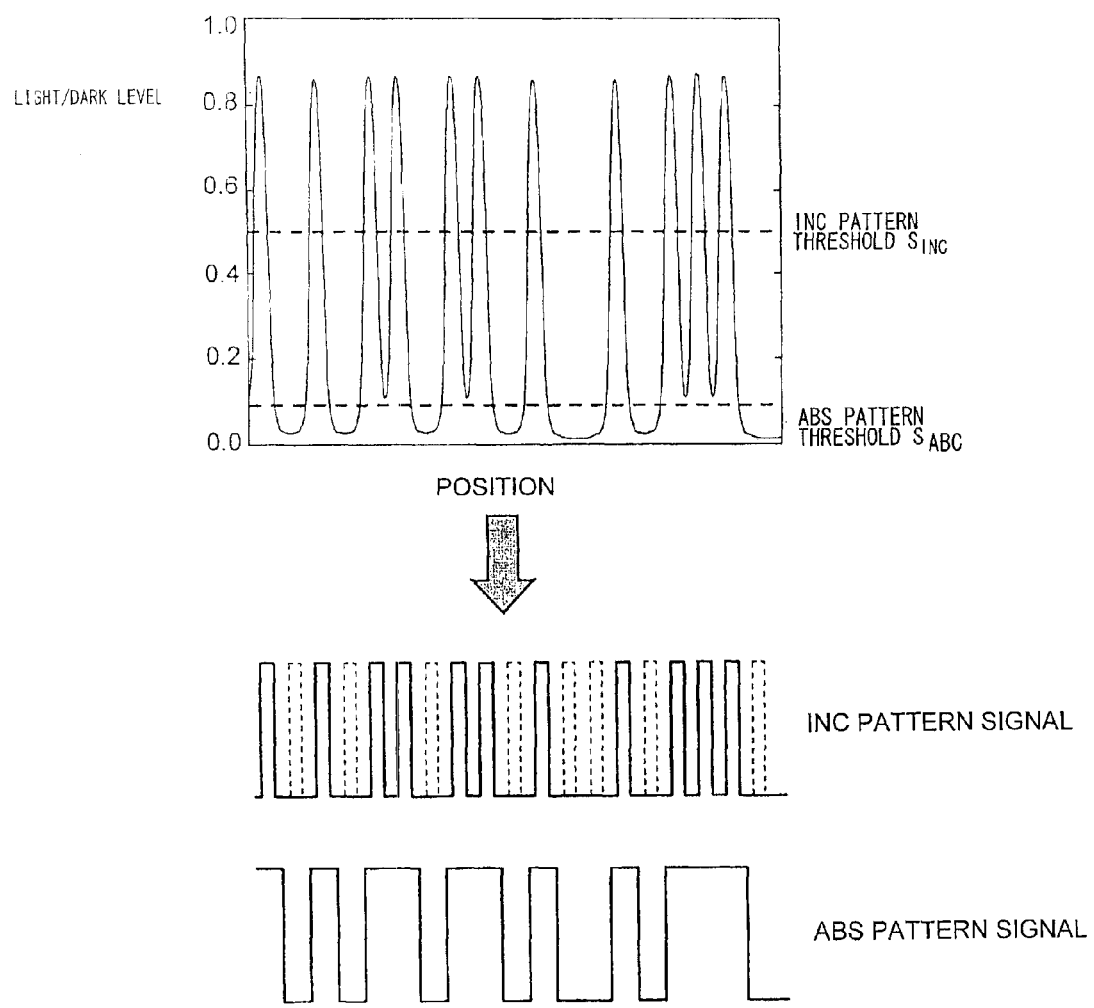
FIG. 6 shows diagrams illustrating thresholds determined by means of the amplitude difference in FIG. 5 and examples of scale pattern signals obtained by binarization by means of the thresholds.
Figure 7:
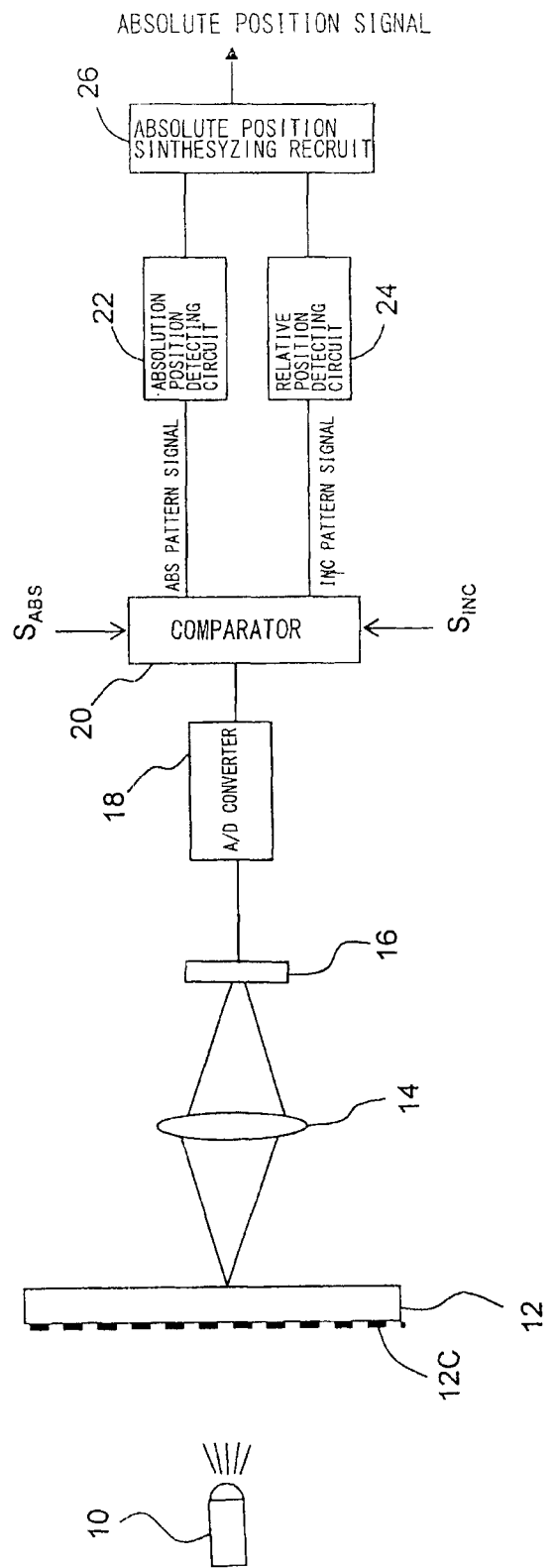
FIG. 7 is a cross-sectional view showing the entire configuration of an absolute position measuring encoder according to a second embodiment of the present invention applied to a transmission type encoder.

Therefore, by utilizing a difference between $A_{ABS-L}$ and $A_{INC-L}$, for example, an absolute pattern signal can be obtained as shown in FIG. 6 by determining the ABS pattern threshold $S_{ABS}$ for separating off the absolute pattern as an intermediate value $S_{ABS}$ between the minimum value $A_{ABS-L}$ of the light and dark signal derived from the absolute pattern and the minimum value $A_{INC-L}$ of the light and dark signal derived from the incremental pattern, i.e., $A_{ABS-L}<S_{ABS}<A_{INC-L}$, and binarizing the received light signal.

Also, an incremental pattern signal can be obtained by determining the INC pattern threshold $S_{INC}$ for separating off the incremental pattern as an intermediate value between the minimum value $A_{INC-L}$ and the maximum value $A_{INC-H}$ of the light and dark signal derived from the incremental pattern, i.e., $A_{INC-L}<S_{INC}<A_{INC-H}$, and binarizing the received light signal.

The thus obtained absolute pattern signal and incremental pattern signal are sent to the absolute position detecting circuit 22 and the relative position detecting circuit 24 so as to obtain an absolute position signal and a relative position signal, respectively. Then, by combining these signals at the absolute position combining circuit 26, it is possible to obtain an absolute position by the absolute position signal interpolated by the relative position signal. Note that since the configurations and functions of the absolute position detecting circuit 22, the relative position detecting circuit 24, and the absolute position synthesizing circuit 26 are the same as those in Patent Literature 1, the detailed description thereof will be omitted. Moreover, a reduction in accuracy resulting from the arrangement of the incremental pattern only at the absolute pattern position can be compensated for by the fitting of a sinusoidal function as described in Japanese Patent Application Laid-Open No. 2010-48607, for example.

Note that while the present invention is applied to the reflective type encoder so that a pattern dark portion includes a signal component in the present embodiment, the application subject of the present invention is not limited thereto. The present invention can be similarly applied to a transmission type encoder such that the light source 10 is arranged on a side opposite to the lens 14 and a pattern light portion includes a signal component as in the second embodiment shown in FIG.

Figure 8:
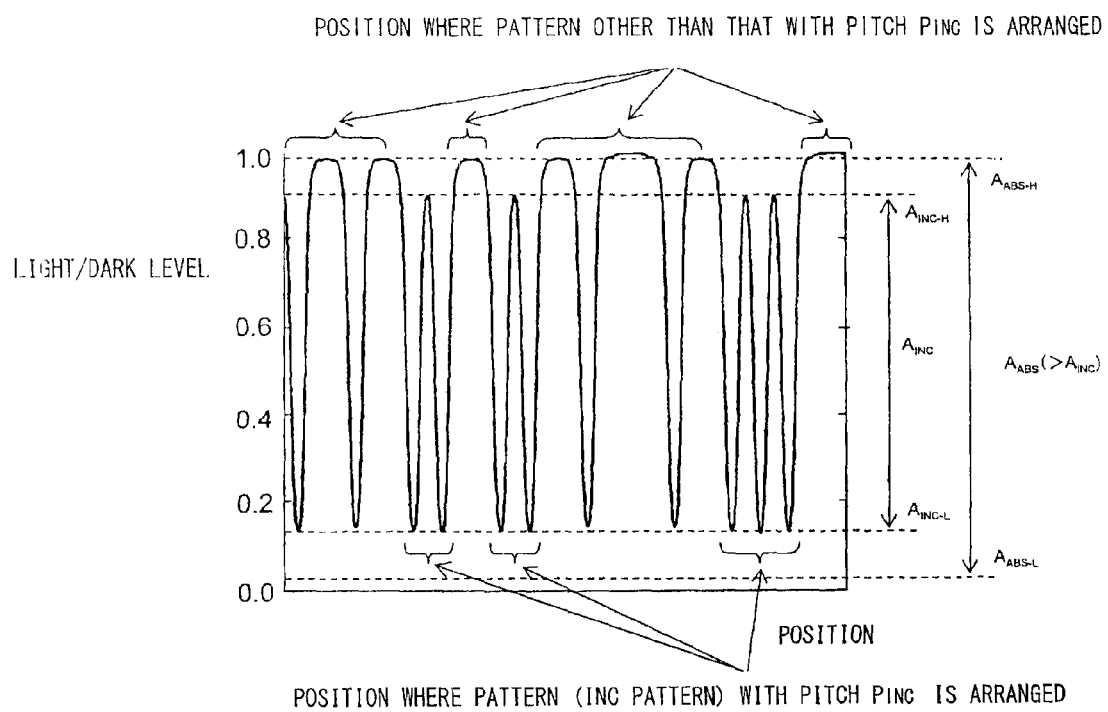
FIG. 8 is a diagram showing an exemplary amplitude difference between a light and dark signal derived from an absolute pattern and a light and dark signal derived from an incremental pattern according to the second embodiment.

In the present embodiment, an amplitude difference between the light and dark signal derived from the absolute pattern and the light and dark signal derived from the incremental pattern is as shown in FIG. 8.

Thus, by setting the threshold $S_{ABS}$ for separating off the absolute pattern to an intermediate value between the maximum value $A_{INC-H}$ of the light and dark signal derived from the incremental pattern and the maximum value $A_{ABS-H}$ of the light and dark signal derived from the absolute pattern, i.e., $A_{INC-H}<S_{ABS}<A_{ABS-H}$, an absolute pattern signal can be obtained as exemplified in FIG. 9. Note that the threshold $S_{INC}$ same as that in the first embodiment can be used in order to separate an incremental pattern signal off.

Since the other respects are the same as those in the first embodiment, the same reference numerals are used for those respects, respectively, and the description thereof will be omitted.

Note that while the absolute pattern is arranged according to the pseudo random pattern in each of the above-described embodiments, the arrangement of the absolute pattern is not limited thereto.

Moreover, while the imaging optical system is configured by a single lens in the above-described embodiments, the configuration of the imaging optical system is not limited thereto.

It should be apparent to those skilled in the art that the above-described embodiments are merely illustrative which represent the application of the principles of the present invention. Numerous and varied other arrangements can be readily devised by those skilled in the art without departing from the spirit and the scope of the invention.

The invention claimed is:

1. An absolute position measuring encoder having an absolute/incremental integrated pattern obtained by integrating an absolute pattern and an incremental pattern together, the absolute position measuring encoder comprising:
   an imaging optical system including a light receiving element, and designed to generate an amplitude difference between a light and dark electric signal derived from the absolute pattern and a light and dark electric signal derived from the incremental pattern; and
   a signal processing system for separating a received light electric signal from the absolute/incremental integrated pattern into an absolute pattern derived electric signal and an incremental pattern derived electric signal by utilizing the amplitude difference.

2. The absolute position measuring encoder according to claim 1, wherein the absolute/incremental integrated pattern is a pattern integrating the absolute pattern and the incremental pattern together in one track by arranging the incremental pattern having a predetermined pitch $p_{INC}$ at a position of the absolute pattern where a pseudo random pattern is arranged.

3. The absolute position measuring encoder according to claim 1, wherein the imaging optical system further includes a lens designed to have an MTF (Modulation Transfer Function) curve so as to generate the amplitude difference between the light and dark electric signal derived from the absolute pattern and the light and dark electric signal derived from the incremental pattern.

4. The absolute position measuring encoder according to claim 3, wherein the lens has an MTF curve such that a light amplitude (contrast) is large for a light from a coarse absolute pattern and a light amplitude (contrast) is small for a light from a fine incremental pattern.

5. The absolute position measuring encoder according to claim 1, wherein the signal processing system includes an A/D converter for converting the received light electric signal output from the light receiving element of the imaging optical system into a multivalued digital signal.

6. The absolute position measuring encoder according to claim 1, wherein the received light electric signal is separated by determining a threshold by means of the amplitude difference and binarizing the received light electric signal.

7. The absolute position measuring encoder according to claim 6, wherein the absolute pattern derived electric signal is separated off by determining the threshold as an intermediate value between a minimum value of the light and dark electric signal derived from the absolute pattern and a minimum value of the light and dark electric signal derived from the incremental pattern and binarizing the received light electric signal.

8. The absolute position measuring encoder according to claim 6, wherein the absolute pattern derived electric signal is separated off by determining the threshold as an intermediate value between a maximum value of the light and dark electric signal derived from the incremental pattern and a maximum value of the light and dark electric signal derived from the absolute pattern and binarizing the received light electric signal.

9. The absolute position measuring encoder according to claim 6, wherein the incremental pattern derived electric signal is separated off by determining the threshold as an intermediate value between a minimum value and a maximum value of the light and dark electric signal derived from the incremental pattern and binarizing the received light electric signal.

10. The absolute position measuring encoder according to claim 1, wherein the signal processing system further includes: an absolute position detecting circuit for detecting an absolute position by processing the absolute pattern derived electric signal; a relative position detecting circuit for detecting a relative position by processing the incremental pattern derived electric signal; and an absolute position synthesizing circuit for combining outputs of the absolute position detecting circuit and the relative position detecting circuit together so as to output an absolute position signal interpolated by the relative position.

11. The absolute position measuring encoder according to claim 1, wherein the absolute position measuring encoder is of a reflective type such that a light source and a lens are arranged on the same side with respect to a scale and a pattern signal component corresponds to a dark portion on the scale.

12. The absolute position measuring encoder according to claim 1, wherein the absolute position measuring encoder is of a transmission type such that a light source is arranged on a side opposite to a lens with respect to a scale and a pattern light portion corresponds to a signal component.

* * * * *